United States Patent
Andoniev et al.

[15] 3,693,708
[45] Sept. 26, 1972

[54] DEVICE FOR EVAPORATIVE COOLING OF METALLURGICAL FURNACES

[72] Inventors: Sergei Mikhailovich Andoniev, Gerber Leonid Moisevich, Grigory Ivanovich Kasyanov, Gennady Alexandrovich Kudinov, Dorina Borisovna Kutsykovich, Tamara Izovna Nissenbaum, Jury Borisovich Raikovsky, all of Kharkov; Mikhail Semenovich Somchenko, Kharkovskoi oblasti; Oleg Vladimirovich Filipiev, Jury Petrovich Entis, both of Kharkov, all of U.S.S.R.

[73] Assignee: Vsesojuzny Nauchno-Issledovatel-sky i Preektny Institut po ochistke Teknologicheskikh gazov i stochuykh vod prospekt lenina, i Ispolzovaniju Vtorichnykh Energo-resursov Predpriyaty Chernoi Metallurgii, USSR, Kharkov

[22] Filed: Sept. 30, 1970

[21] Appl. No.: 76,702

[52] U.S. Cl. .................165/101, 165/146, 266/32
[51] Int. Cl. ............................................F28f 27/02
[58] Field of Search .....266/32; 263/44; 165/76, 101, 165/146

[56] References Cited

UNITED STATES PATENTS 2,333,439  11/1943  Peters.........................266/32
1,427,611  8/1922   MacCamy..................165/101

Primary Examiner—Leonidas Vlachos
Attorney—Holman & Stern

[57] ABSTRACT

A device for evaporative cooling of metallurgical furnaces, which comprises banks of vertically arranged cooling members connected in series, wherein pipes for passing the coolant in each bank are connected to individual supply and discharge headers.

2 Claims, 2 Drawing Figures

DEVICE FOR EVAPORATIVE COOLING OF METALLURGICAL FURNACES

The present invention relates generally to metallurgy, and more particularly to devices for evaporative cooling of metallurgical furnaces, specifically, blast furnaces.

Known in the art is a device for evaporative cooling of blast furnaces that consists of vertically arranged members to be cooled, which members accommodate pipes (usually four) for passing the coolant, the members to be cooled being mutually interconnected along a vertical line by means of by-pass connection pipes and, together with supply and discharge headers and a source of coolant, constituting a closed circulation circuit, all the rows of the interconnected pipes of the vertical bank of the cooled members being connected in parallel to common headers.

The known device for evaporative cooling is disadvantageous in that when detecting a faulty pipe of the members to be cooled and disconnecting it, it is necessary to stop feeding the coolant to the entire vertical bank of the members being cooled.

The process of detecting and disconnecting the faulty pipe being rather long and involving repeated shutting off and feeding of the coolant to the bank of the members to be cooled, which otherwise may become considerably overheated, thermal stresses originate in said members causing damage thereof and thus shortening their service life.

It is an object of the present invention to eliminate said disadvantage.

The main object of the invention is to provide such a device, in which, when detecting faulty members being cooled and disconnecting them, the feeding of the coolant to all the rows of pipes of the cooled members will not be discontinued and, hence, adequate cooling of the members will not be disturbed.

Said object is accomplished by the provision of a device for evaporative cooling of metallurgical furnaces, particularly, of blast furnaces, that includes banks of vertically arranged members which accommodate pipes for passing the coolant, said members being mutually interconnected along a vertical line by means of external connection pipes, constituting, together with headers adapted to supply and discharge the coolant, vertical circulation circuits. According to the invention, the number of supply and discharge headers is equal to the number of pipes in the member being cooled and each row of vertically interconnected pipes in each bank of cooled members is connected to one of the headers that is common to similarly arranged rows of pipes in other vertical banks of the members being cooled.

It is preferred that even and odd rows of interconnected pipes in each bank of vertical cooled members be combined in pairs and connected to individual headers.

The device for evaporative cooling according to the invention ensures adequate cooling of the members of a vertical bank when detecting faulty pipes and discontinuing the feed of coolant to one or two rows of pipes (out of the four) in the members of the bank being checked.

The present invention will now be described by way of an exemplary embodiment thereof, with due reference to the accompanying drawings, in which.

Figure 1:
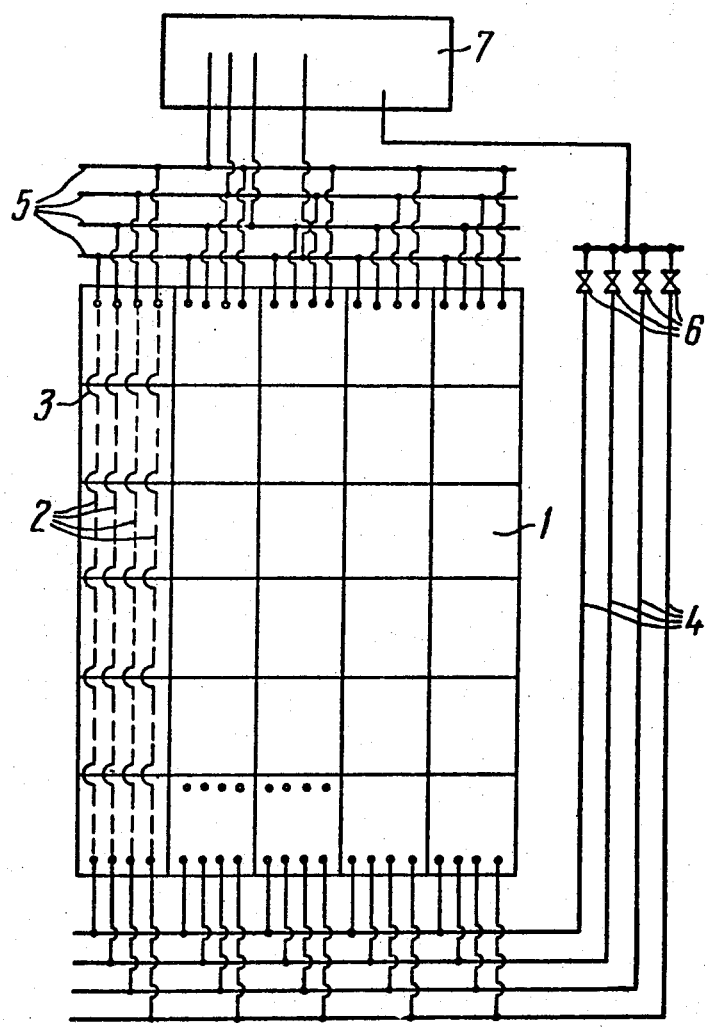
FIG. 1 shows a principal diagram of the device for evaporative cooling according to the invention, with the number of supply and discharge headers in compliance with the number of members being cooled.

The device for evaporative cooling of metallurgical furnaces, preferably of blast furnaces, proposed herein, comprises members 1 to be cooled (FIG. 1) which accommodate built-in pipes 2 for passing the coolant, said pipes being mutually interconnected along a vertical line by means of by-pass connection pipes 3 and constituting, together with supply headers 4 and discharge headers 5 provided with locking members 6 and a reservoir 7 containing a liquid to be evaporated, a closed circulation circuit.

The number of supply headers 4 and discharge headers 5 is equal to the number of pipes in the member being cooled, which in this particular case equals four.

The cooled members, interconnected along a vertical line, make up banks of members. The supply of the coolant to the members and its discharge therefrom is effected in such a manner that to each independent header only one of the rows of pipes of each vertical bank of members being cooled is coupled. The remaining rows of pipes of this member are also independently coupled each to its header, the headers being common to similarly arranged rows of pipes in other vertical banks of cooling members.

Such an embodiment of the device ensures, when detecting faulty pipes and disconnecting them in any bank of the members, the supply of the coolant to be discontinued by means of the locking member 6 only to one row of pipes of each bank of members, the circulation of the coolant being continued in the remaining rows of pipes, thus providing for normal cooling of the entire bank of the members being cooled. This enables the prolonging of the life of the cooled members and facilitates their service.

Figure 2:
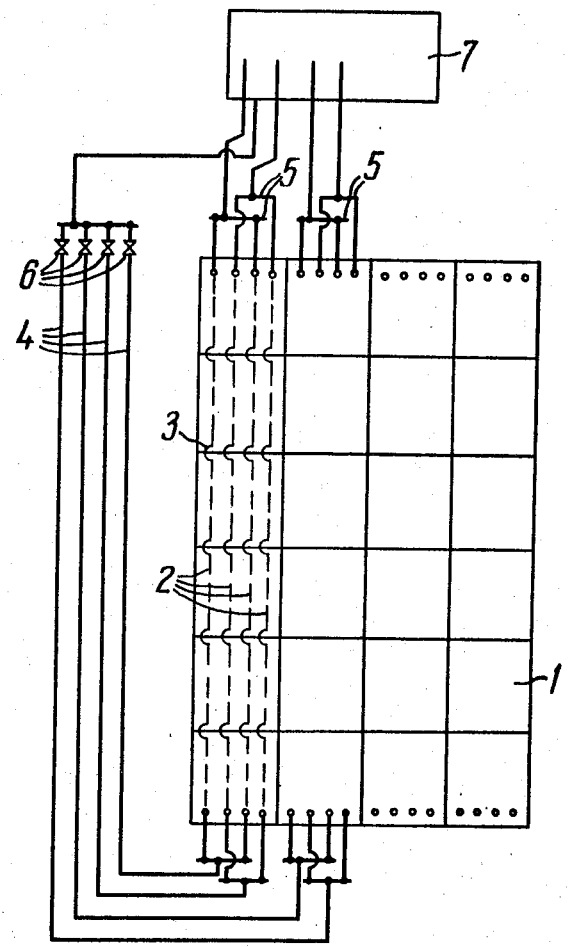
FIG. 2 shows the same device with the even and odd rows of interconnected pipes combined in pairs and with each pair of rows coupled to individual headers.

In another embodiment of the device, including, according to the invention, the same structural members, the even and odd rows of the pipes 2 (FIG. 2) of each bank of the members 1 being cooled are interconnected, and each pair of the rows is coupled to the independent individual headers 4 and 5 which number is two for each vertical bank of the cooling members.

With such an embodiment of the device, in the course of detection and disconnection of faulty pipes the coolant is not fed only to two rows of pipes which are spaced from each other by another row, and only in one bank of members. In this case the other two rows of pipes remaining operative also ensure adequate cooling of the members.

What is claimed is:

1. A device for evaporative cooling of metallurgical furnaces, particularly blast furnaces, comprising banks of vertically arranged members to be cooled that accommodate pipes for passing the coolant, external pipes that connect the pipes of one cooling member of a bank with the pipes of another cooling member of the same bank, headers adapted to supply the coolant to, and discharge it from, said cooling members, said headers forming together with the external pipes and the pipes of the cooling members a vertical circulation circuit, the number of the discharge and supply headers being equal to the number of the pipes in one cooling member, each row of vertically connected pipes in each bank being coupled to one of said supply headers and one of said discharge headers which are common to similarly arranged rows of pipes in the other banks of the cooled members.

2. A device as claimed in claim 1, wherein even and odd rows of pipes in each bank of cooled members are combined in pairs and each pair of rows is coupled to individual headers.

* * * * *